United States Patent

Hartman et al.

[11] Patent Number: 5,215,813
[45] Date of Patent: Jun. 1, 1993

[54] BALLISTIC MATERIALS

[75] Inventors: David R. Hartman, Newark; Ralph B. Jutte, Hebron; Timothy W. Ramey, Chillicothe, all of Ohio

[73] Assignee: Owens-Corning Fiberglas Corporation, Toledo, Ohio

[21] Appl. No.: 813,616

[22] Filed: Dec. 26, 1991

[51] Int. Cl.5 .................. C03C 25/02; D03D 3/00
[52] U.S. Cl. ..................... 428/226; 428/911; 428/273; 428/290; 65/3.43
[58] Field of Search ............... 428/226, 911; 65/3.43

[56] References Cited

U.S. PATENT DOCUMENTS 4,620,860 11/1986 Werbowy .................. 65/3.43
5,006,293 4/1991 Hartman et al. ............ 428/911

Primary Examiner—George F. Lesmes
Assistant Examiner—Kathryne E. Shelborne
Attorney, Agent, or Firm—Ted C. Gillespie; Patrick P. Pacella

[57] ABSTRACT

The present invention provides a fiberglass composite which possesses outstanding armor properties. This ballistic resistant composite material employs high strength magnesia aluminosilicate glass fibers and phenol formaldehyde condensation product as the matrix resin. The composite is produced from sheet molding compound using little or no solvent.

2 Claims, No Drawings

BALLISTIC MATERIALS

TECHNICAL FIELD

The present invention relates to glass fiber composite articles which have ballistic resistant properties. Even yet more particularly our invention relates to thick, self-supportable ballistic resistant composites which may be used as structural armor.

BACKGROUND ART

Ballistic resistant articles which contain high strength fibers for use as structural members and panels for a wide variety of military equipment are known. Recently, one of us developed ballistic resistant materials which are fire-resistant, smoke resistant, non-toxic, non-conductive, self-supporting and stiff, machineable, thick and strong so as to allow their use in structural armor applications and as ballistic resistant liners.

First, a prepreg that can be easily handled is formed. The prepreg is formed by coating high strength magnesia aluminosilicate glass fibers with a solution of a partially condensed, further condensable low molecular weight phenol formaldehyde resole reaction product and evaporating the solvent from the solution. The coated fibers then are heated to increase the resole molecular weight and thereby form the easily handleable prepreg. Prepreg plies are then molded by heating under pressure until by-product water gradually escapes. Then they are heated to an elevated temperature and held at that temperature to fully polycondense and cure the resin. A plurality plies of such prepregs will be molded to form the ballistic composites.

These recent improvements were obtained with solutions containing large amount of solvents; i.e., 25% alcohol, 10% water and excess formaldehyde. See U.S. Pat. No. 4,842,923 issued in 1989.

DISCLOSURE OF THE INVENTION

Our invention is a solventless, SMC product of phenolic resin and high strength glass. This invention eliminates the alcohol and most of the water from the old product. As a result, we don't have to drive those products with heat when forming a prepreg. We can use conventional, low cost sheet molding equipment and processing to produce the ballistic material. The simpler SMC product still results in high protection ballistic limits ($V_{50}$ values in excess of 2,400 feet per second). We have obtained good results with essentially no alcohol, very little water and only a slight excess of formaldehyde.

BEST MODE OF CARRYING OUT INVENTION

In practicing the present invention we employ conventional equipment and techniques for producing sheet molding compounds (SMC). For example, the SMC in sheet or flat form includes a pair of flexible, outer plastic films with a moldable material or compound therebetween. To provide a desired molding charge, the SMC can be cut to approximate sizes or shapes for a given mold cavity and, after the outer sheets are removed, the compound can be used in multiple layers. In this manner, the molding compound can be distributed in the die or mold cavity in an approximation such that very high pressures are not required to form the completed molded product. By employing several layers of the molding compound, in place of one thicker body of resin and fibers, greater uniformity of the composite material throughout the cavity can also be achieved. The composites are also easy to handle and can be adapted to automatic mechanical handling techniques.

SMC utilizes a single, common source of resin-containing material for application to both outer plastic films forming the surfaces of the SMC. The resin-containing material includes a liquid resin, a catalyst, and preblended solids or fillers along with a mold-release material, and a thickening agent. The combined and mixed material is fed to a common supply point from which it is then divided into two streams. One stream is directed to an upper surface of a first one of the outer films of plastic and the other stream is directed optionally to the upper surface of the second one of the outer films of plastic, with the material uniformly spread on both sheets. Reinforcing fibers are uniformly distributed over the resin-containing material on the first sheet. Subsequently, the second sheet is directed into parallel relationship with respect to the first sheet with the resin-containing material on the second sheet moved into contact with the fibers on the first sheet.

The resulting composite thus has identical resin-containing layers on both of the films and it is only necessary to mix the middle layer of fibers with the two resin-containing material layer of fibers to achieve a uniform molding compound throughout the space between the outer two plastic sheets. This mixing can be achieved by passing the composite between sets of rollers which knead the material and enable the fibers to be wet-out thoroughly with respect to the two resin-containing layers. The upper film, or both if desired, can then be punctured to release air from the material within, with further kneading or compression applied to force out the air.

Heat then may be applied to continue wet-out and chemically thicken the SMC, after which the SMC can be rolled onto a reel for easy storage until ready for use. By controlling the formulation of the resin-containing material, the SMC can be stored anywhere from a few days to several months or longer without curing, thereby retaining the soft, pliable, non-tacky condition desired for the molding process. U.S. Pat. No. 3,861,982 issued in 1975 further describes equipment and processes for producing SMC.

Magnesia aluminosilicate glass fibers used herein are high strength fibers and typically have a tensile strength in excess of about $3.5 \cdot 10^6$ kilopascals (500,000 psi). These fibers are roughly about two-thirds by weight silica, and typically on the order of about 65% by weight silica, and one-third being magnesia and alumina with the alumina being present in a greater amount than the magnesia. Typically alumina will be about 25% by weight and magnesia about 10% by weight for outstanding results. Best results are obtained when the fibers have a water resistant, impact debondable size coating thereon. Preferred size coatings are sizes containing an epoxy based film former and an epoxy silane coupling agent along with other conventional materials. Preferred form of glass is a balanced woven roving configuration. Woven roving weights of 24 oz/yd² have commonly been used. Various applications have required weave weight range of 8–48 oz/yd² and specialty woven, crossply, biaxial, triaxial, or quasi axial construction. The reinforcement form of woven roving or otherwise assembled fabric or mat maintains ballistic performance in final part and also allows proper consolidation, fiber orientation, and fiber conformity to complex shapes under both compression and vacuum bag molding conditions. Other suitable forms include specialty mats and weaves, crossply biaxial, triaxial, and quasi axial assemblies.

The phenol formaldyhde resin is a resole phenolic. In the past, satisfactory results were obtained by employing resins in which the molar reactant ratio of formaldehyde to phenol is between about 1:1 to about 3:1, with best results beings obtained from 1.1:1 to 1.6:1. We have discovered that formaldehyde to phenol ratio's between 1.1:1 to less than 1.5:1 work best in our SMC.

The number of SMC plies which are molded will generally be sufficient to form a final composite product having an areal density of at least about 12.2 Kg per square meter (2.5 pounds per square foot). For other applications, for example, ship board type applications it generally will be desirable to form composites having densities in excess of about 36.6 Kg per square meter (7.5 pounds per square foot) and typically between about 36.6 $Kg/M^2$ (7.5 pounds per square foot) to about 41.5 $Kg/M^2$ (8.5 pounds per square foot). Satisfactory vehicle spall liners are produced by using a sufficient number of plies to produce areal density of an excess of about 19 $Kg/M^2$ (3.9 pounds per square foot) and about 25.4 Kg per square meter (5.2 pounds per square foot). Usually on the order of about 13 to about 26 plies will produce outstanding products. Typically, with a glass content in the final product on the order of about 78% to about 84% (by weight), outstanding composites are achieved. Generally the ballistic resistant panels of this invention will have a thickness on the order of at least about 6.4 millimeter (¼ inch) and may be as thick as 76.2 mm (3 inches or more).

A plurality of SMC plies will be molded to form composites having an areal density greater than at least about 2.5 pounds per square foot. Typically the laminated composite panels formed in accordance with the present invention, when formed to a thickness of the order of about ½ inch with an areal density between about 4.5 to about 5.2 (pounds per square foot), will have a $V_{50}$ value (protection ballistic limit) of in excess of about 2,400 feet per second up to as high as 2,865 feet per second or even higher (with 44 grain steel 0.30 caliber fragment simulating projectiles).

While the above enables those skilled in the art to make and use the present invention, a more specific example follows:

EXAMPLE

The SMC is produced using reinforcement input of a 24 $oz/yd^2$ woven roving made with a balanced plain weave construction form S-2 Glass ® 463AA250 roving. The Borden SL359 resole phenolic resin is metered uniformly onto the bottom plastic processing film using a doctor blade or knife edge coater which is set at about an uniform 20 mil opening. The woven roving is continuously dispensed onto the bottom coated film, and conveyed to where an uncoated top film is continuously applied to the top surface. The SMC then is conveyed to a double chain link belt compaction section that is applying compression pressure to force the resin into the woven roving, while moving in a serpentine mode to work the glass for improved wet-out.

After compaction the SMC passes over an inspection station to transmit light through the layered film to assure uniform impregnation has been achieved by proper alignment of knife edge impregnation has been achieved by proper alignment of knife edge coater and compaction. The pretensioned SMC is rolled up by a standard SMC turret. The roll configuration is preferred to maintain good contact of resin coated film with the reinforcement to allow further wicking of resin into the woven roving at either room temperature or up to 90° F.

The SMC is then stored until required for molding. The SMC can be molded flat, curvilinear, or to complex tooling in a hydraulic compression molding press following process conditions described in prior U.S. Pat. No. 4,842,923 issued in 1989.

This low advanced SMC also provides the opportunity to mold in an alternate process referred to as vacuum bagging. Conventional phenolic prepreg would normally be to far advanced in cure to allow molding in a low pressure, vacuum forming method.

The SMC compound is of a pliable nature and can be placed by hand or machine into a complex shape (other than a flat configuration), consolidated and cured using state-of-the-art vacuum forming technology. Care must be given to the selection of heat/moisture resistant films or the use of an elastomeric forming bag for molding this material.

Mold time and temperature can be adjusted to part thickness and mass such that full consolidation and removal of condensation can occur similar to the cure and performance established in prior U.S. Pat. No. 4,842,923.

Having described my invention it is, of course, apparent that modifications are possible which pursuant to the patent statutes and laws do not depart from the spirit and scope thereof.

INDUSTRIAL APPLICABILITY

The present invention describes an SMC fiber glass composite of a high strength magnesia aluminosilicate glass fibers and a phenol formaldehyde condensation product as the matrix resin. The composite has a high resistance to penetration by ballistic penetrants and can be used for armor or as a spall liner for military vehicles, ship and aircraft. The composite also has a high structural ability and can be used for vehicle subcomponents such as a turret or as the vehicle structural hull.

We claim:

1. Sheet molding compound including high strength magnesia aluminosilicate glass fibers in a fabric or mat form and partially condensed further condensable phenol formaldehyde resole reaction produce being formed by reacting formaldehyde and phenol in a molar ratio of greater than about 1:1 and less than about 1.5:1, wherein said sheet molding compound results in glass fiber composite having a desired thickness and when said composite has a thickness of ½ inch it has an areal density between 4.5 to 5.2 pounds per square foot and has a $V_{50}$ value, protection ballistic limit, in excess of 2,400 feet per second with 44 grain steel 0.30 caliber fragment simulating projectiles, said sheet molding compound being essentially alcohol free and containing up to 3 weight percent water.

2. Sheet molding compound according to claim 1 wherein the glass fibers are woven roving fabric.

* * * * *